United States Patent
Ho

(10) Patent No.: US 6,752,229 B2
(45) Date of Patent: Jun. 22, 2004

(54) VEHICLE WITH MOTOR AND ENGINE

(76) Inventor: Chien-Chang Ho, No. 16-2, 35th Road, Taichung Industrial Zone, Taichung (TW)

(*) Notice: Subject to any disclaimer, the term of this patent is extended or adjusted under 35 U.S.C. 154(b) by 0 days.

(21) Appl. No.: 10/200,169

(22) Filed: Jul. 23, 2002

(65) Prior Publication Data

US 2004/0016582 A1 Jan. 29, 2004

(51) Int. Cl.[7] ............................................. B62M 7/08
(52) U.S. Cl. .................... 180/181; 180/65.3; 180/220; 474/70; 192/48.3
(58) Field of Search ........................ 180/65.1, 65.2, 180/65.3, 65.4, 65.6, 65.7, 181, 180, 219, 220; 474/70, 69, 74, 148; 192/42, 105 CD, 105 BA, 48.3

(56) References Cited

U.S. PATENT DOCUMENTS

| | | | | |
|---|---|---|---|---|
| 2,849,094 A | * | 8/1958 | Vaiden | 192/69.81 |
| 3,935,749 A | * | 2/1976 | Groves | 74/6 |
| 4,697,664 A | * | 10/1987 | Kohyama | 180/226 |
| 5,388,659 A | * | 2/1995 | Pepe | 180/219 |
| 5,667,029 A | * | 9/1997 | Urban et al. | 180/65.2 |
| 5,845,757 A | * | 12/1998 | Csonka | 192/105 BA |
| 6,037,726 A | * | 3/2000 | Tabata et al. | 318/139 |
| 6,155,954 A | * | 12/2000 | Itoyama et al. | 477/5 |
| 6,158,543 A | * | 12/2000 | Matsuto et al. | 180/220 |
| 6,179,078 B1 | * | 1/2001 | Belloso | 180/69.6 |
| 6,218,804 B1 | * | 4/2001 | Toriyama et al. | 320/104 |
| 6,326,765 B1 | * | 12/2001 | Hughes et al. | 320/104 |
| 6,555,928 B1 | * | 4/2003 | Mizuno et al. | 290/40 C |

* cited by examiner

Primary Examiner—Bryan Fischmann
Assistant Examiner—Jeffrey J. Restifo
(74) Attorney, Agent, or Firm—Rosenberg, Klein & Lee

(57) ABSTRACT

A vehicle includes a frame on which are mounted a front wheel, a rear wheel, an engine, a battery-powered motor, and a transmission connecting the rear wheel with the engine and the motor. The motor can be used as a generator so as to transform motive energy produced via the engine into electric energy for storage in the battery. The engine may include a crankshaft, a pulley connected with the transmissions, and a first clutch arranged between the crankshaft and the pulley which does not transmit power therebetween until its angular speed reaches a pre-determined value. The engine includes an automatic starter connected therewith. A second clutch arranged between the automatic starter and the motor switches between a neutral position and an active position whereby the automatic starter is selectively engaged for and disengaged from operation responsive to the motor.

10 Claims, 7 Drawing Sheets

VEHICLE WITH MOTOR AND ENGINE

BACKGROUND OF INVENTION

1. Field of Invention

The present invention relates to a vehicle equipped with a motor and an engine.

2. Related Prior Art

Some skateboard scooters are equipped with motors and batteries. A skateboard scooter equipped with a motor and a battery is light in weight and small in size, and makes a low level of noise in operation. However, such a skateboard scooter cannot be ridden up a steep slope since its motor provides a small torque. Such a skateboard scooter cannot be ridden for a long distance because its battery stores a small amount of energy. Some other skateboard scooters are equipped with engines and fuel tanks in order to avoid the problems encountered in the use of the skateboard scooters equipped with motors and batteries. However, a skateboard scooter equipped with an engine and a fuel tank makes a big noise in use and therefore is not acceptable in a quiet neighborhood.

The present invention is therefore intended to obviate or at least alleviate the problems encountered in prior art.

SUMMARY OF INVENTION

It is the primary objective of the present invention to provide a vehicle that can be switched between a quiet mode for use in a quiet neighborhood and a sports mode for use in a demanding situation.

According to the present invention, a vehicle includes a frame, at least one front wheel mounted on the frame, at least one rear wheel mounted on the frame, an engine mounted on the frame, a motor mounted on the frame and a transmission connecting the at least one rear wheel with the engine and the motor.

The vehicle includes a battery mounted on the frame for providing energy to the motor. The battery may be a rechargeable battery.

The motor can be used as a generator so as to transform motive energy produced via the engine into electric energy for storage in the battery.

The engine may include a crankshaft, a pulley connected with the transmission and a first clutch arranged between the crankshaft and the pulley. The first clutch does not transmit power from the crankshaft to the pulley until an angular speed of the crankshaft reaches a pre-determined value.

In a first aspect, the engine includes a manual starter connected therewith.

In a second aspect, the engine includes an automatic starter connected therewith. A second clutch may be arranged between the automatic starter and the motor and switched between a neutral position where it does not transmit power to the automatic starter from the motor and an active position where it transmits power to the automatic starter from the motor.

The transmission may include a shaft, a pulley mounted on the shaft, a belt connecting the pulley with a pulley secured to the at least one rear wheel, a pulley mounted on the shaft, a belt connecting the pulley with a pulley mounted on a mandrel of the motor, a pulley mounted on the shaft and a belt connecting the pulley with a pulley mounted on the first clutch.

Other objects, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF PREFERRED EMBODIMENTS

Figure 1:
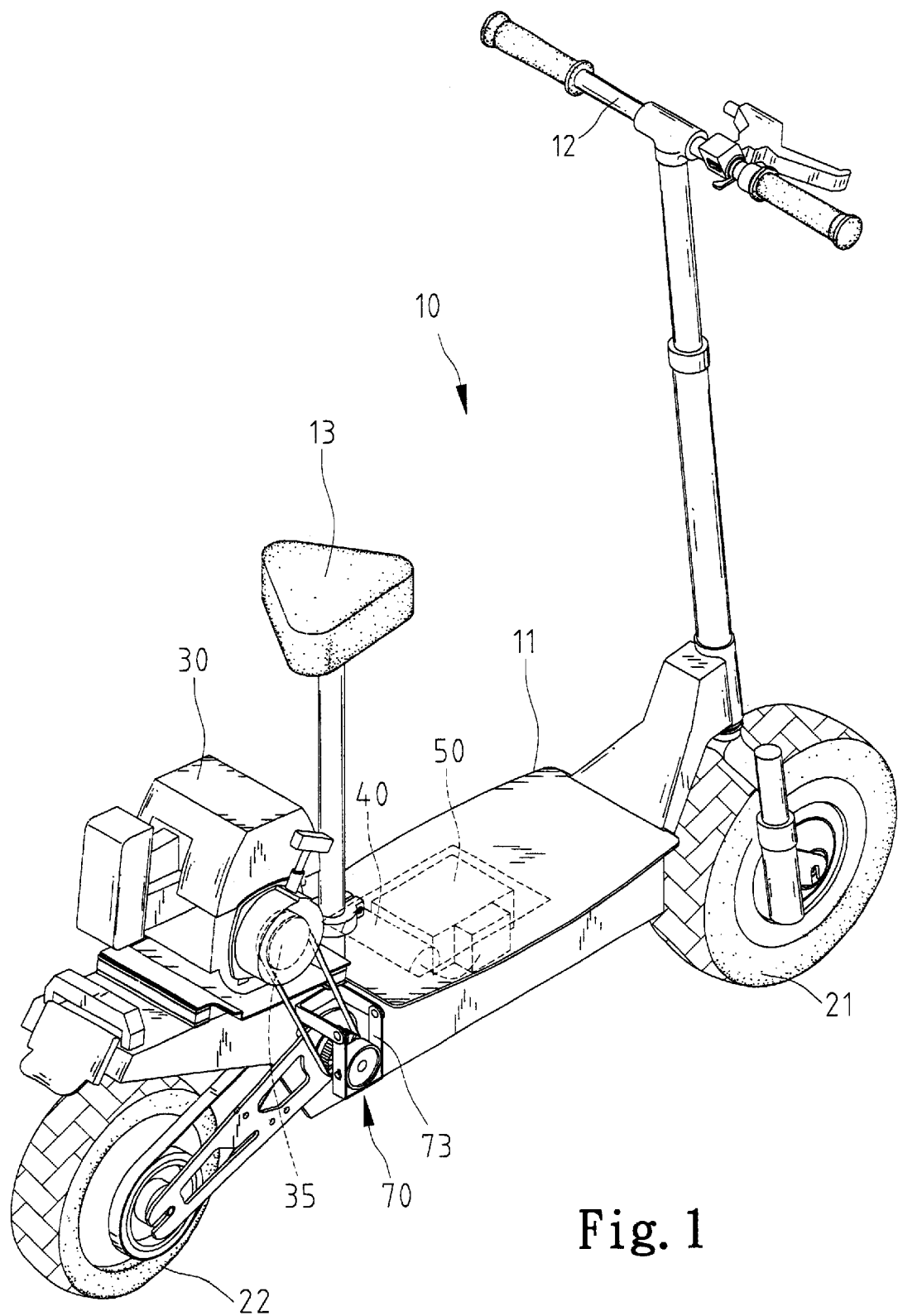
FIG. 1 is a perspective view of a skateboard scooter with a driving device consisting of a motor and an engine according to a first embodiment of the present invention.
Figure 2:
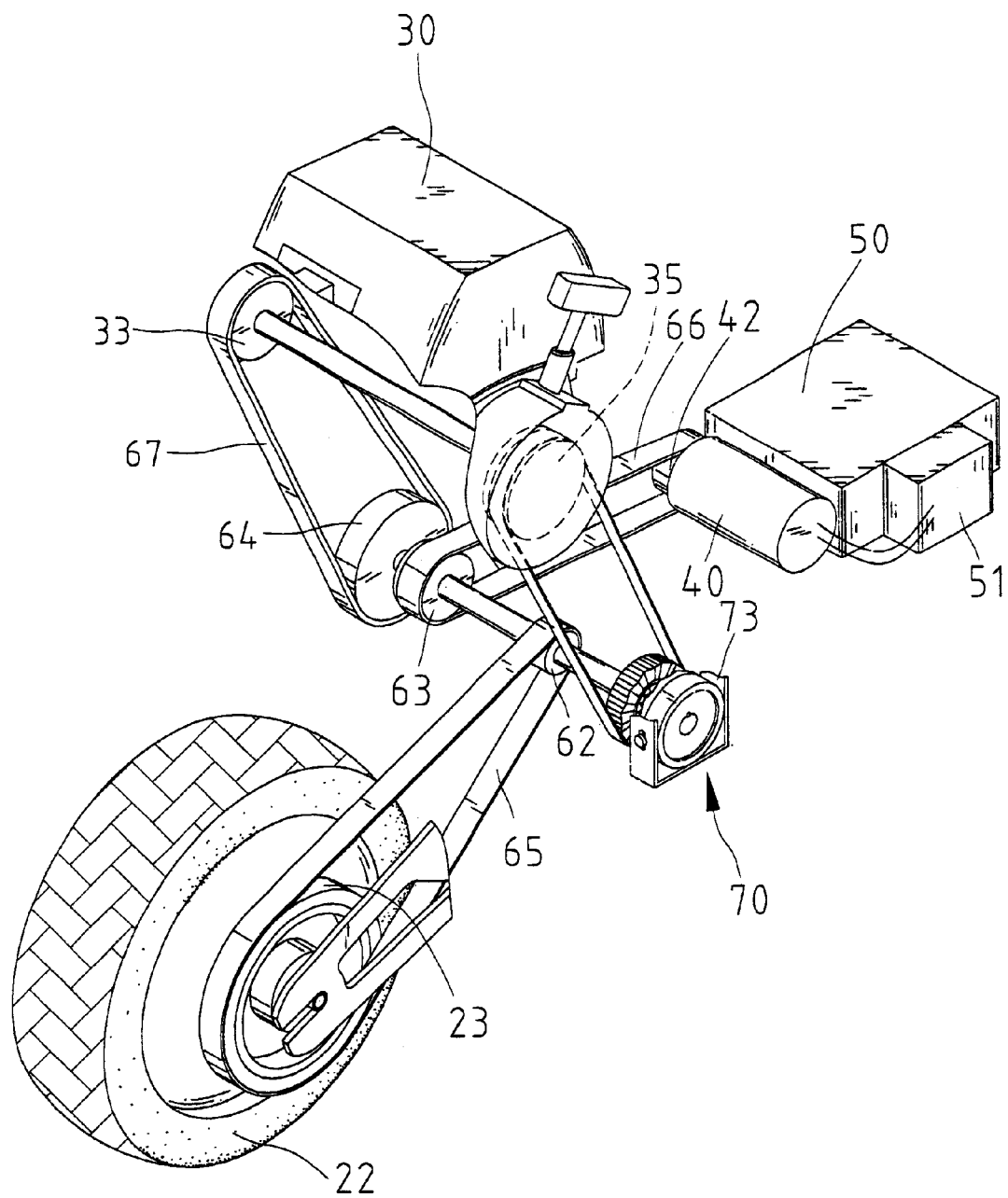
FIG. 2 is a perspective view of the driving device.

Referring to FIGS. 1~4, according to a first embodiment of the present invention, a skateboard scooter 10 includes a frame 11, a seat 13 mounted on the frame 11, a front fork (not numbered) that is mounted on the frame 11 and formed with a shank and two prongs extending downwards from the shank, a handle 12 mounted on the shank of the front fork, a front wheel 21 mounted on the prongs of the front fork, a rear wheel 22 mounted on the frame 11, an engine 30 mounted on the frame 11, a motor 40 mounted on the frame 11, a battery 50 mounted on the frame 11 for providing energy to the motor 40 and a transmission 60 for connecting the rear wheel 22 with the engine 30 and the motor 40.

The skateboard scooter 10 may include a clutch 70 arranged between the engine 30 and the motor 40. The clutch 70 can be switched between a neutral position where it does not transmit power to the engine 30 from the motor 40 and an active position where it transmits power to the engine 30 from the motor 40.

The engine 30 may be a Diesel, Otto or rotary engine or any other engine that uses internal combustion. The engine 30 includes a crankshaft 31, a pulley 33 and a clutch 32 arranged between the crankshaft 31 and the pulley 33. The clutch 32 is designed so that it does not transmit power from the crankshaft 31 to the pulley 33 until an angular speed of the crankshaft 31 reaches a pre-determined value such as 3000 rpm (round per minute). The engine 30 is connected with a manual starter 34. The engine 30 can be started via operation of the manual starter 34. The engine 30 is connected with an automatic starter 35. The automatic starter 35 is connected with the clutch 70 so that power can be transmitted from the motor 40 to the automatic starter 35. Thus, when powered, the automatic starter 35 can start the engine 30. The motor 40 includes a mandrel 41 and a pulley 42 mounted on the mandrel 41. The motor 40 may be a DC motor. Preferably, the motor 40 is a motor/generator, i.e., it can be used as a generator when driven by means of the engine 30.

The battery 50 is used to provide energy to the motor 40. Preferably, the battery 50 is a rechargeable battery and is equipped with a recharge controller 51. Thus, motive energy that comes from the engine 30 can be transformed into electric energy via the motor/generator 40. Such electric energy is transferred to the battery 50 through the recharge controller 51 and stored in the battery 50. The battery 50 may be replaced with a solar cell.

The transmission 60 includes a shaft 61, a pulley 62 mounted on the shaft 61, a belt 65 for connecting the pulley 62 with a pulley 23 secured to the rear wheel 22, a pulley 63 mounted on the shaft 61, a belt 66 for connecting the pulley 63 with the pulley 42, a pulley 64 mounted on the shaft 61 and a belt 67 for connecting the pulley 64 with the pulley 33.

The clutch 70 includes a pulley 71 rotationally mounted on the shaft 61, a gear 72 movably mounted on the shaft 61 for driving the pulley 71, a bracket 73 for moving the gear 72 along the shaft 61 and a rope 74 for operating the bracket 73.

The pulley 71 includes a toothed end face. The gear 72 includes a toothed end face corresponding to that of the pulley 71. When the gear 72 is located against the pulley 71, the toothed end face of the gear 72 is engaged with the toothed end face of the pulley 71. Thus, the pulley 71 can be driven via the gear 72.

The pulley 71 is mounted on the shaft 61 via a bearing 75. The automatic starter 35 is connected with the pulley 71 via a belt 76.

Figure 3:
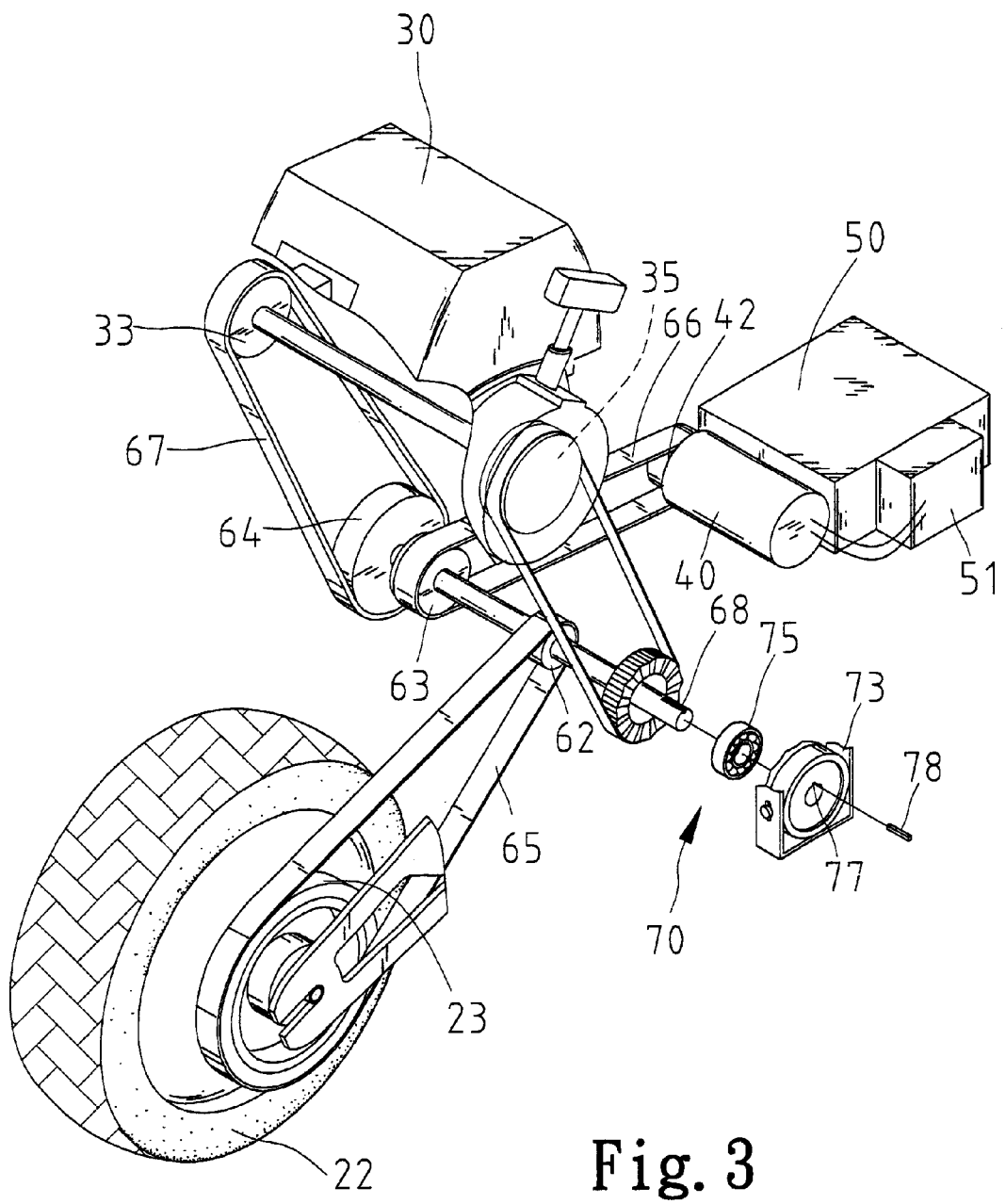
FIG. 3 is an exploded view of the driving device.

As best shown in FIG. 3, the shaft 61 defines a groove 68. A groove 77 is defined in the gear 72. A key 78 is fit in the groove 68. When the gear 72 is mounted on the shaft 61, the key 78 is received in the groove 77. Thus, the gear 72 can move along the shaft 61 but cannot rotate on the shaft 61.

A bearing 79 is arranged between the gear 72 and the bracket 73 so as to allow relative rotation between them but avoid relative axial movement. The bracket 73 is connected with the rope 74. The rope 74 is connected with a control element in the form of a lever or pedal (not shown) or any other appropriate form. With a hand or foot, a rider can operate the control element in order to engage the pulley 71 with the gear 72 through the rope 74 and the bracket 73.

In the shown embodiment, pulleys and belts are used to transmit power. However, the pulleys may be replaced with sprockets and the belts with chains.

Figure 4:
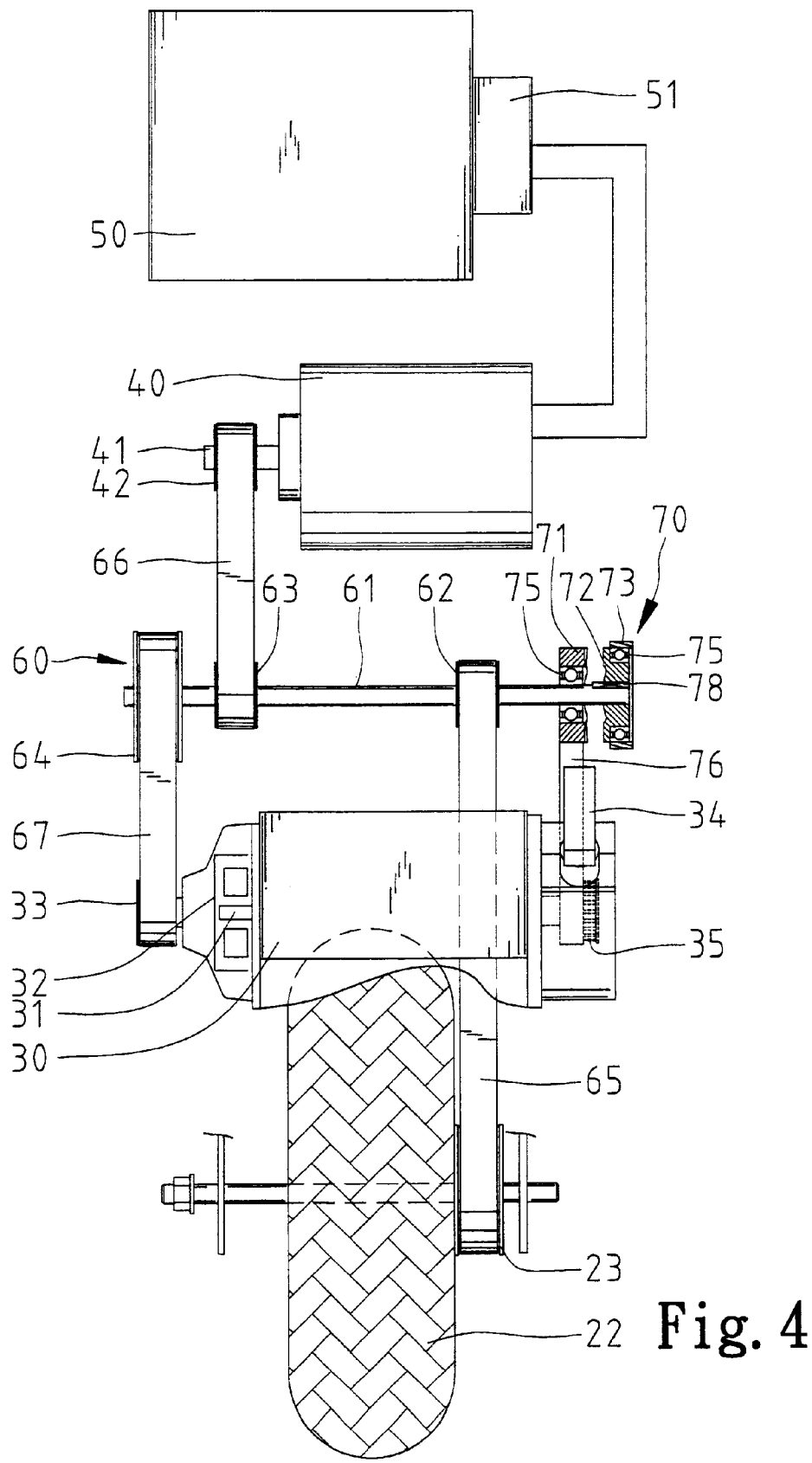
FIG. 4 is a top view of the driving device in a first mode where the motor is used to drive the skateboard scooter.

FIG. 4 shows the motor 40 drives the rear wheel 22. The mandrel 41 rotates the pulley 42. The pulley 42 drives the belt 66. The belt 66 rotates the pulley 63. The pulley 63 rotates the shaft 61. The shaft 61 rotates the pulley 62. The pulley 62 drives the belt 65. The belt 65 rotates the pulley 23. The rear wheel 22 rotates together with the pulley 23.

As mentioned, instead of the motor 40, the engine 30 can be used to drive the rear wheel 22, particularly when the skateboard scooter 10 is ridden in a demanding situation. The engine 30 must be started beforehand. The engine 30 can be started manually or automatically.

To manually start the engine 30, the rider turns off the motor 40, has the gear 72 disengaged from the pulley 71 as shown in FIG. 4, and operates the manual starter 34 in order to start the engine 30.

Figure 5:
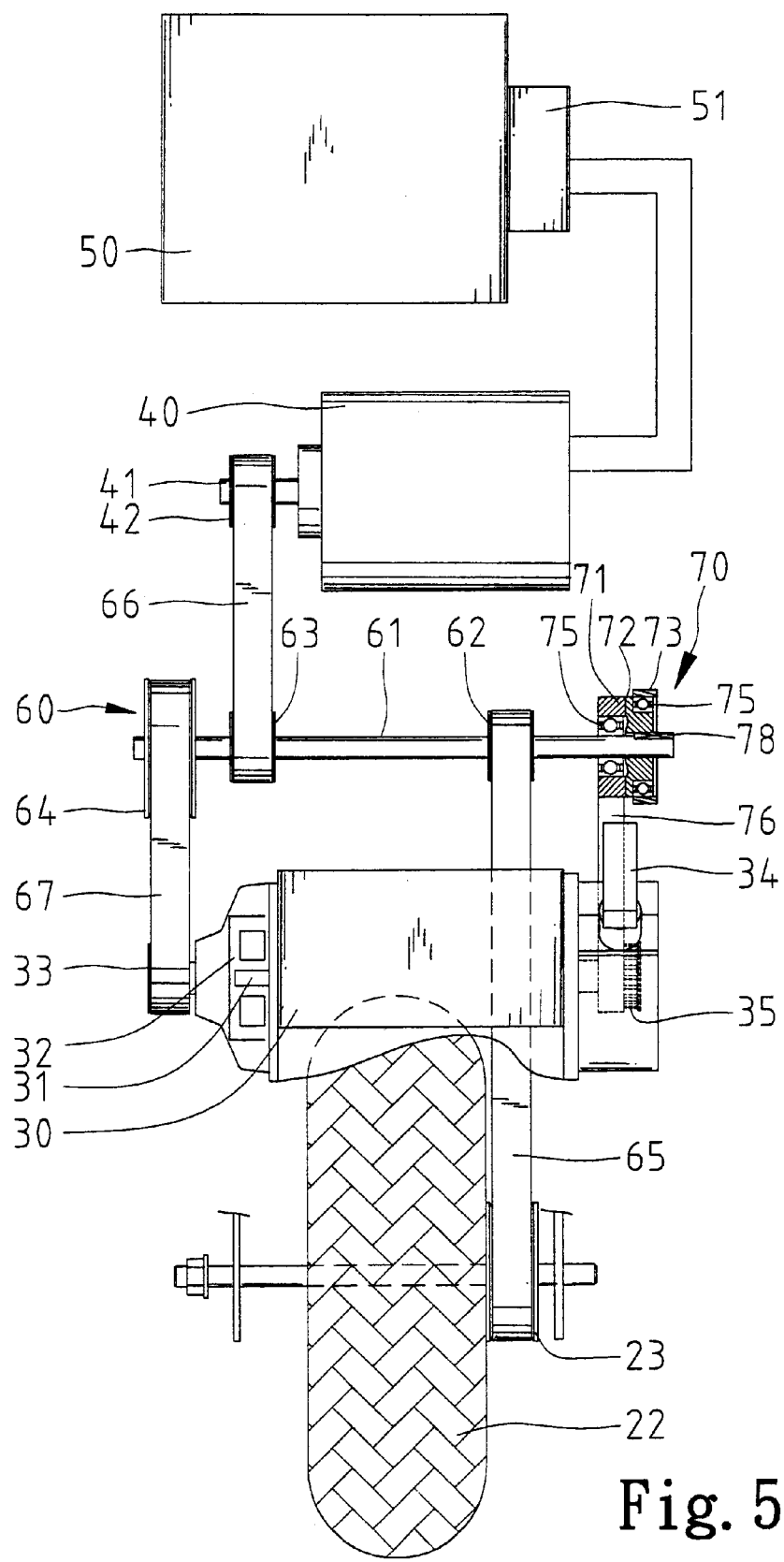
FIG. 5 is similar to FIG. 4 except for showing the driving device in a position where the motor is used to start the engine.

To automatically start the engine 30, the rider turns on the motor 40, and engages the gear 72 with the pulley 71 as shown in FIG. 5. The mandrel 41 rotates the pulley 42. The pulley 42 drives the belt 66. The belt 66 rotates the pulley 63. The pulley 63 rotates the shaft 61. The shaft 61 rotates the gear 72. The gear 72 rotates the pulley 71. The pulley 71 drives the belt 76. The belt 65 rotates the automatic starter 35. The automatic starter 35 starts the engine 30. Then, the user can turn off the motor 40 and disengage the gear 72 from the pulley as shown in FIG. 4.

When the annular speed of the mandrel 41 is below the pre-determined value, the clutch 32 is in a neutral position where the clutch 32 does not transmit power from the crankshaft 31 to the pulley 33 as shown in FIG. 4.

Figure 6:
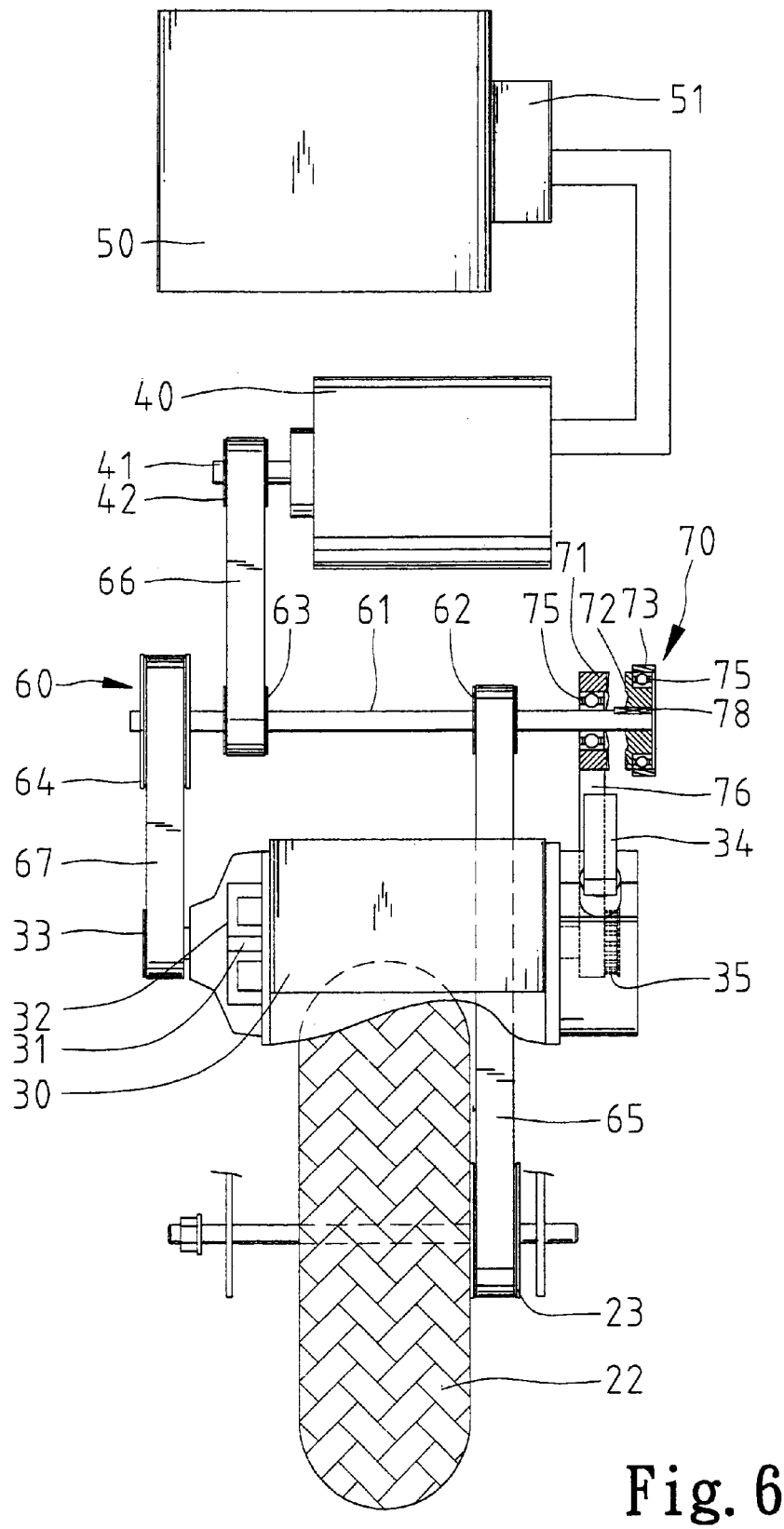
FIG. 6 is similar to FIG. 4 except for showing the driving device in a second mode where the engine is used to drive the skateboard scooter.

When the annular speed of the mandrel 41 reaches the pre-determined value, the clutch 32 is in an active position where the clutch 32 transmits power from the crankshaft 31 to the pulley 33 as shown in FIG. 6. The pulley 33 drives the belt 67. The belt 67 rotates the pulley 64. The pulley 64 rotates the shaft 61. The shaft 61 rotates the pulley 62. The pulley 62 drives the belt 65. The belt 65 rotates the pulley 23. The rear wheel 22 rotates together with the pulley 23.

Figure 7:
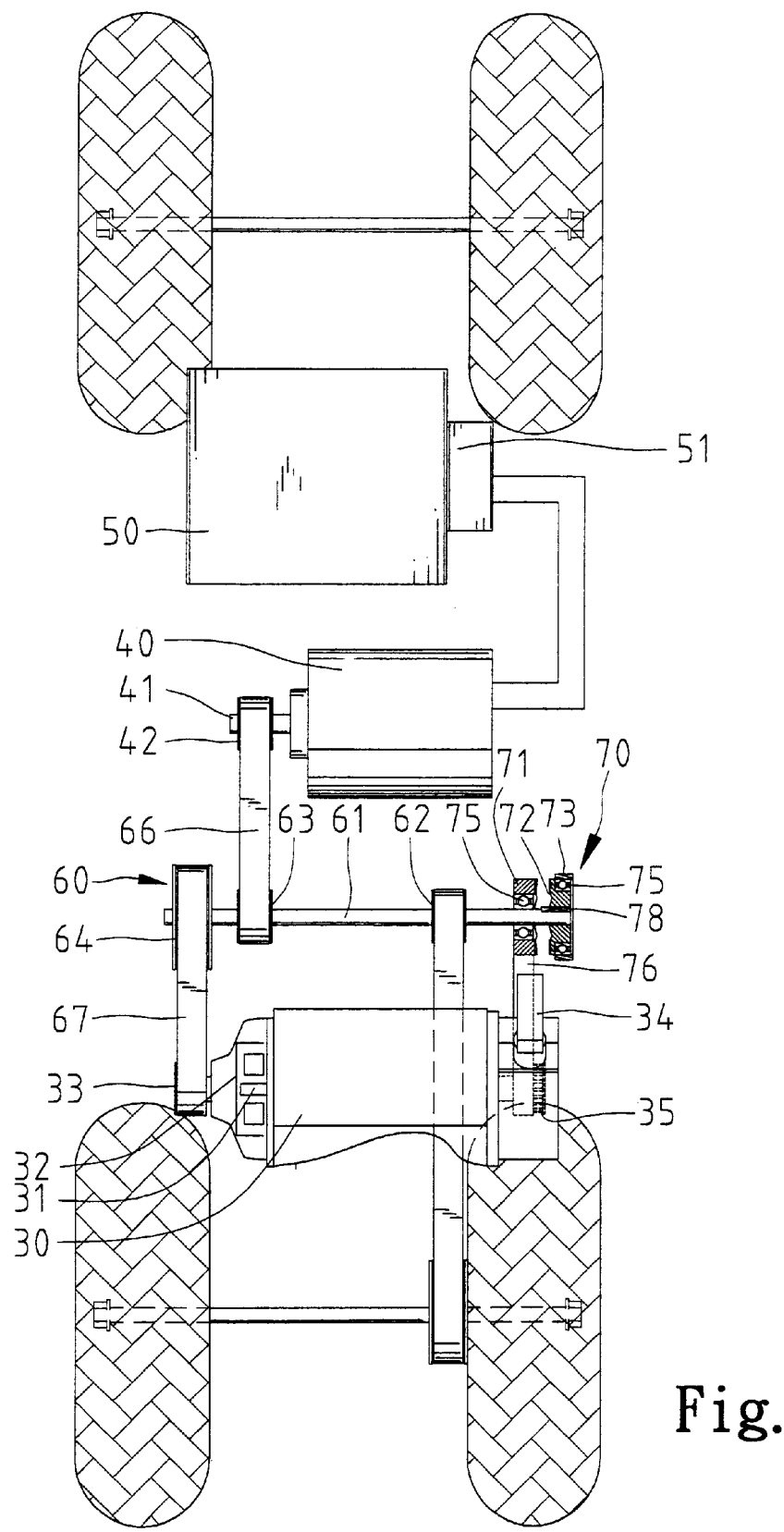
FIG. 7 is a top view of a driving device of a skateboard scooter according to a second embodiment of the present invention.

FIG. 7 shows a skateboard scooter according to a second embodiment of the present invention. The second embodiment is identical to the first embodiment except for including two front wheels and two rear wheels.

The present invention has been described through detailed illustration of the preferred embodiments. Those skilled in the art can derive many variations from the preferred embodiments without departing from the scope of the present invention. Therefore, the preferred embodiments shall not limit the scope of the present invention. The scope of the present invention is defined in the attached claims.

What is claimed is:

1. A vehicle comprising:
    a frame (11), at least one front wheel (21) mounted on the frame (11), at least one rear wheel (22) mounted on the frame (11), an engine (30) mounted on the frame (11), a motor (40) mounted on the frame (11), and a transmission (60) including a shaft (61), a first pulley (62) mounted on the shaft (61), a first belt(65) connecting the first pulley (62) with the second pulley (23) secured to the at least one rear wheel (22) a third pulley (63) mounted on the shaft (61), a second belt (66) connecting the third pulley (63) with a fourth pulley (42) secured to a mandrel (41) of the motor (40) a fifth pulley (64) mounted on the shaft (61) and a third belt (67) connecting the fifth pulley (64) with a sixth pulley (33) mounted on a clutch (32) connected with a crankshaft (31) of the engine (30);
    wherein the engine (30) includes an automatic starter (35) connected
    a clutch (70) being arranged between the automatic starter (35) and the motor (40) and switched between a neutral position where it does not transmit power to the automatic starter (35) from the motor (40) and an active position where it transmits power to the automatic starter (35) from the motor (40):
    wherein the clutch (70) includes a seventh pulley (71) rotationally mounted on the shaft (61) and a gear (72) movably mounted on the shaft (61) for driving the pulley (71); and,
    wherein the seventh pulley (71) includes a toothed end face, and the gear (72) includes a toothed end face for engagement with that of the seventh pulley (71).

2. The vehicle according to claim 1 wherein the clutch (70) includes a bearing (75) arranged between the seventh pulley (71) and the shaft (61).

3. The vehicle according to claim 1 including a fourth belt (76) connecting the seventh pulley (71) with the automatic starter (35).

4. The vehicle according to claim 1 wherein the shaft (61) defines a groove (68), and the clutch (70) includes a groove (77) defined in the gear (72) and a key (78) fit in the groove

(68) defined in the shaft (61) 50 that the key (78) is received in the groove (77) defined in the gear (72) when the gear (72) is mounted on the shaft (61).

5. The vehicle according to claim 1 including a bracket (73) connected with the gear (72) so that the bracket (73) can be operated in order to move the gear (72) along the shaft (61).

6. The vehicle according to claim 1 including a battery mounted on the frame (11) for providing energy to the motor (40).

7. The vehicle according to claim 6, wherein the battery (50) is a rechargeable battery.

8. The vehicle according to claim 7 wherein the motor (40) can be used as a generator so as to transform motive energy produced via the engine (30) into electric energy for storage in the battery (50).

9. The vehicle according to claim 1 wherein the clutch (32) does not transmit power from the crankshaft (31) to the sixth pulley (33) until an angular speed of the crankshaft (31) reaches a pre-determined value.

10. The vehicle according to claim 1, wherein the engine (30) includes a manual starter (34) connected therewith.

* * * * *